United States Patent [19]
Kato et al.

[11] Patent Number: 5,637,652
[45] Date of Patent: Jun. 10, 1997

[54] ELECTROCONDUCTIVE POLYMER AND PROCESS FOR PRODUCING THE SAME

[75] Inventors: Junya Kato; Yoshihiro Saida; Yoshiaki Ikenoue, all of Chiba; Reiko Ichikawa, Osaka, all of Japan

[73] Assignee: Showa Denko Kabushiki Kaisha, Tokyo, Japan

[21] Appl. No.: 254,691

[22] Filed: Jun. 6, 1994

[30] Foreign Application Priority Data

Jun. 4, 1993 [JP] Japan ................................. 5-134978

[51] Int. Cl.$^6$ ............................. C08G 2/30; C08G 61/12; C08G 61/00
[52] U.S. Cl. ........................ 525/389; 528/230; 528/248
[58] Field of Search ..................... 525/417, 389; 528/86, 422, 423, 230, 248

[56] References Cited

U.S. PATENT DOCUMENTS

| | | | |
|---|---|---|---|
| 3,992,203 | 11/1976 | Horhold et al. | 252/501 |
| 4,528,118 | 7/1985 | Murase et al. | 252/500 |
| 4,798,685 | 1/1989 | Yaniger | 528/397 |
| 4,937,163 | 6/1990 | Tam et al. | 252/519 |
| 4,983,690 | 1/1991 | Cameron et al. | 525/436 |
| 5,064,572 | 11/1991 | Ohnishi et al. | 252/500 |
| 5,185,100 | 2/1993 | Han et al. | 252/500 |
| 5,198,153 | 3/1993 | Angelopoulos et al. | 252/500 |
| 5,202,061 | 4/1993 | Angelopoulos et al. | 252/500 |
| 5,237,023 | 8/1993 | Oka | 525/540 |
| 5,246,627 | 9/1993 | Heeger et al. | 252/500 |
| 5,317,169 | 5/1994 | Nakau et al. | 257/40 |

FOREIGN PATENT DOCUMENTS 2-258832  10/1990  Japan.

OTHER PUBLICATIONS

Macromolecules, Aug. 1992, 25, 4215–4217.
Derwent WPI Abstract of JP2258832, Oct. 1990.
Derwent WPI Abstract of JP2258833, Oct. 1990.
Dao et al. "Synthesis and Characterization of Substituted Poly(anilines)" Synthetic Metals, 29 (1989) E377–E382.
Barton et al., Comprehensive Organic Chemistry, Pergamon Press, vol. 3 (1979), p. 346.

*Primary Examiner*—Jeffrey C. Mullis
*Attorney, Agent, or Firm*—Sughrue, Mion, Zinn, Macpeak & Seas

[57] ABSTRACT

An electroconductive polymer comprising a repeating unit having a chemical structure represented by formula (I):

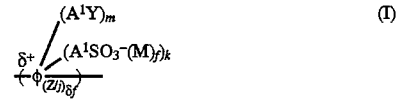

or, formula (II):

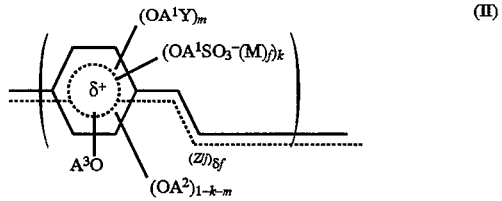

as defined herein, and a process for producing the same.

17 Claims, 2 Drawing Sheets

ELECTROCONDUCTIVE POLYMER AND PROCESS FOR PRODUCING THE SAME

FIELD OF THE INVENTION

The present invention relates to a novel electroconductive polymer which is extremely stable, and has excellent solubility in an organic solvent and/or water, as well as to a process for producing the same. More specifically, the present invention relates to a novel soluble electroconductive polymer suitable for use in an electrode, a sensor, an electronic display element, a non-linear optical element, a photoelectric conversion element, or an antistatic agent, which encounters severe processability requirements in the field of electric and electronic industries, as well as being suitable for various electroconductive or optical materials.

BACKGROUND OF THE INVENTION

Polymers enriched in a π-electron conjugated system have attracted industrial attention due not only to their electroconductive properties, but also due to their unique physical properties, such as their ability to change chemical or physical state upon metal/semiconductor transition, and investigations have been made on these polymers. In particular, although many electroconductive polymers, such as polyacetylene, polythiophene, polypyrrole, and polyparaphenylene are insoluble and infusible due to their rigid main skeletons (see Skotheim, *Handbook of Conducting Polymers*, Marcel Dekker, 1986), if a substituent, such as an alkyl group, is incorporated into their side chains, these polymers become soluble and easy to process, thus attracting attention in the industry.

Specific known examples of such polymers are a polymer rendered soluble by incorporating a long-chain alkyl group into the side chain of polythiophene (K. Jen et al., *Journal of Chemical Society, Chemical Communication*, p. 1346, 1986), and a polymer rendered water-soluble by incorporating an alkylsulfonic acid group (A. O. Patil, *Journal of American Chemical Society*, vol. 109, p. 1858, 1987). Further, a technique for the indirect processing of a rigid polymer by making use of the solubility of its precursor polymer is known, although the resulting electroconductive polymer having a π-electron conjugated system is insoluble and infusible (Murase et al., *Polymer Communications*, vol. 25, p. 327, 1984).

Among many π-electron conjugated polymers, a bicyclic electroconductive polymer, in particular, a polymer having an isothianaphthenylene structure, has the lowest bandgap as a semiconductor, and is expected to have a high conductivity. Therefore, it is of particular interest because when this polymer is converted into a p-type electroconductor by electrochemical doping, the π-π* absorption moves from the visible region towards the near infrared region, and the polymer becomes a transparent electroconductor (Kobayashi et al., *Journal of Chemical physics*, vol. 82, p. 5717, 1985). However, polyisothianaphthene, which was first electrochemically synthesized by Kobayashi et al., is an insoluble and infusible polymer and had a processability problem.

Accordingly, various investigations have been carried out in an attempt to make improvements from an industrial standpoint. Reports on some derivatives have already been made. For example, it is assumed from calculation results that when an electron-attracting group or an electron-donating group is introduced into an isothianaphthenylene skeleton, the electron state as a semiconductor is affected (see Bredas et al., *Journal of Chemical Physics*, vol. 85, p. 4673, 1986). An organic solvent-soluble derivative introduced by a long-chain alkoxy group into the isothianaphthenylene skeleton for improving processability has also been reported (JP-A-2-242816, the term "JP-A" as used herein means an "unexamined published Japanese patent application").

Additional examples include polymers having a halogen as a substituent (JP-A-63-307604), and polymers having an electron-attracting group as a substituent (JP-A-2-252727). However, none of the above-mentioned publications describe any of the characteristics of the polymers of the present invention, nor disclose any specific production process therefor.

SUMMARY OF THE INVENTION

An object of the present invention is to solve the problems of prior techniques as described above, and to provide a novel electroconductive polymer having excellent solubility in an organic solvent or water, which is very stable, and is suitable for the various uses and materials described above.

Another object of the present invention is to provide a process for producing such a polymer.

DETAILED DESCRIPTION OF THE INVENTION

Of π-electron conjugated polymers, a π-conjugated polymer having a polar substituent, such as a sulfonamide group, a sulfonic acid ester group and a sulfonic acid thioester group, have been found to have good stability, high conductivity, and high solubility. For example, a soluble electroconductive polymer comprising a repeating unit such as isothianaphthenylene, isobenzofurylene, isoindolylene, isobenzoselenylene, isobenzotellurylene, phenylenevinylene, or 1,4-iminophenylene structure, wherein the structure contains the above-described polar substituent. However, a production method for such polymers have not heretofore been disclosed.

To achieve the above-described objects in the present invention, practically advantageous soluble electroconductive polymers have been developed which have a polar substituent, such as a sulfonamide group, a sulfonic acid ester group, and a sulfonic acid thioester group. These polymers can be easily produced by reacting amines, alcohols, or thiols with a π-conjugated electroconductive polymer having a sulfonic acid group, which is easy to produce. The present invention has been accomplished based on this finding.

The present invention particularly relates to the following electroconductive polymers (P1) to (P11):

(P1) an electroconductive polymer comprising a repeating unit having a chemical structure represented by formula (I):

(I)

(II)

wherein φ represents a divalent group selected from the group consisting of a divalent group of a monocyclic heterocyclic ring having from 5 to 7 members or a condensed heterocyclic ring having from 9 to 40 members, a hetero atom of the heterocyclic ring being selected from the group consisting of nitrogen, sulfur, oxygen, selenium and tellurium, a divalent group having vinylene connected with the above-described divalent group, arylene, arylenevinylene and 1,4-iminophenylene; $A^1$ represents a linear or branched, saturated or unsaturated alkylene group having from 1 to 10 carbon atoms, with one terminal thereof substituting for H of the C—H bond or the N—H bond in φ to connect with the carbon or nitrogen atom, with the proviso that when $A^1$ is not present Y or $SO_3^-(M)_f$ is connected directly to the carbon or nitrogen atom in φ, and $A^1$ may optionally contain a carbonyl, ether, ester, thioether, amide or sulfone bond; Y represents $SO_2NR^1R^2$, $SO_3R^3$ or $SO_2SR^4$ wherein $R^1$ and $R^2$ each independently represents hydrogen, a linear or branched, saturated or unsaturated alkyl group having from 1 to 20 carbon atoms, preferably from 1 to 12 carbon atoms, or a substituted or unsubstituted aryl group having from 4 to 30 carbon atoms, preferably from 6 to 12 carbon atoms, $R^3$ and $R^4$ each independently represents a linear or branched, saturated or unsaturated alkyl group having from 1 to 20 carbon atoms, preferably from 1 to 12 carbon atoms, or a substituted or unsubstituted aryl group having from 6 to 20 carbon atoms, preferably from 6 to 12 carbon atoms. $R^1$ and $R^2$ may combine with each other at an optional position to form a divalent saturated or unsaturated hydrocarbon chain which, together with the nitrogen atom, forms a heterocyclic structure, and the alkyl chain of $R^1$, $R^2$, $R^3$ or $R^4$ may optionally contain a carbonyl, ether, ester, thioether, amide or sulfone bond; M represents a cation such as $H^+$, an alkali metal ion, such as $Na^+$, $Li^+$ and $K^+$, or an alkyl- or aryl-substituted or unsubstituted cation of a Group Vb element, such as a substituted or unsubstituted quaternary ammonium ion; f represents 0 or 1; Z represents an anion; j represents 1 or 2 and indicates the absolute value of the valence number of Z; and δ ranges from 0 to 1, with the proviso that the total number of the substituent $A^1Y$ and/or $A^1SO_3^-(M)_f$ per repeating unit having such substituent is 1 or 2, k and m each represents an average substitution degree of φ in the polymer, k ranges from 0 to 1.9, m ranges from 0.1 to 2, k+m is 2 or less when such substituent is bonded to the carbon atom in φ, k+m is 1 or less when such substituent is bonded to the nitrogen atom, and k and δ are equal when f is 0;

(P2) an electroconductive polymer comprising a repeating unit having a chemical structure represented by formula (I), wherein δ is a value of 0<δ≦1 and f is 0;

(P3) an electroconductive polymer comprising a repeating unit having a chemical structure comprising a phenylenevinylene skeleton represented by formula (II):

wherein $A^1$ represents a linear or branched, saturated or unsaturated alkylene group having from 1 to 10 carbon atoms, with the proviso that when $A^1$ is not present Y or $SO_3^-(M)_f$ is connected directly with the oxygen atom bonded to the phenylene; $A^2$ and $A^3$ each independently represents hydrogen or a linear or branched, saturated or unsaturated alkyl group having from 1 to 10 carbon atoms, and $A^1$ $A^2$ or $A^3$ may optionally contain a carbonyl, ether, ester, thioether, amide, or sulfone bond; Y represents $SO_2NR^1R^2$, $SO_3R^1$, or $SO_2SR^4$ wherein $R^1$ and $R^2$ each independently represents hydrogen, a linear or branched, saturated or unsaturated alkyl group having from 1 to 20 carbon atoms, preferably from 1 to 12 carbon atoms, or a substituted or unsubstituted aryl group having from 4 to 30 carbon atoms, preferably from 6 to 12 carbon atoms, $R^3$ and $R^4$ each independently represents a linear or branched, saturated or unsaturated alkyl group having from 1 to 20 carbon atoms, preferably from 1 to 12 carbon atoms, or a substituted or unsubstituted aryl group having from 6 to 20 carbon atoms, preferably from 6 to 12 carbon atoms. $R^1$ and $R^2$ may combine with each other at an optional position to form a divalent saturated or unsaturated hydrocarbon chain which, together with the nitrogen atom, forms a heterocyclic structure, and the alkyl chain of $R^1$, $R^2$, $R^3$ or $R^4$ may optionally contain a carbonyl, ether, ester, thioether, amide or sulfone bond; M represents a cation such as $H^+$, an alkali metal ion, such as $Na^+$, $Li^+$ and $K^+$, and an alkyl- or aryl-substituted or unsubstituted cation of a Group Vb element, such as a substituted or unsubstituted quaternary ammonium ion; f represents 0 or 1; Z represents an anion; j represents 1 or 2 and indicates the absolute value of the valence number of Z; and δ ranges from 0 to 1;

with the proviso that the total number of the substituent $OA^1Y$, $OA^1SO_3^-(M)_f$, and/or $(OA^2)_{1-k-m}$ per repeating unit having such substituent is 1, k and m each represents an average substitution degree of phenylene in the polymer, k ranges from 0 to 0.9, m ranges from 0.1 to 1, k+m is 1 or less, and k and δ are equal when f is 0;

(P4) an electroconductive polymer comprising a repeating unit having a chemical structure comprising a phenylenevinylene skeleton represented by formula (II), wherein δ is a value of 0<δ≦1 and f is 0;

(P5) an electroconductive polymer comprising a repeating unit having a chemical structure represented by formula (I), wherein the nitrogen atom in φ which has a nitrogen atom, has a substitutent $(A^4)_{1-n}$, wherein $A^4$ is a linear or branched, saturated or unsaturated alkyl group having from 1 to 10 carbon atoms, $A^4$ may optionally contain a carbonyl, ether, ester, thioether, amide, or sulfone bond, and 1−n is 1 or less and indicates an average substitution degree of the nitrogen atom by $A^4$ in the polymer;

(P6) an electroconductive polymer comprising a repeating unit having a chemical structure represented by formula (I), wherein φ is a divalent group of a condensed heterocyclic ring represented by formula (III):

wherein $R^5$ and $R^6$ each independently represents hydrogen, a linear or branched, saturated or unsaturated alkyl or alkoxy group having from 1 to 20 carbon atoms, a halogen, a nitro group, an amino group, a trihalomethyl group, or a substituted or unsubstituted phenyl group, and X represents sulfur, oxygen, selenium, tellurium, or $NR^7$, wherein $R^7$ represents hydrogen, a linear or branched, saturated or unsaturated alkyl group having from 1 to 10 carbon atoms, or a substituted or unsubstituted aryl group having from 6 to 10 carbon atoms;

(P7) an electroconductive polymer comprising a repeating unit having a chemical structure represented by formula (I), wherein φ is a divalent group of a monocyclic heterocyclic ring represented by formula (IV):

wherein $R^5$ represents hydrogen, a linear or branched, saturated or unsaturated alkyl or alkoxy group having from 1 to 20 carbon atoms, a halogen, a nitro group, an amino group, a trihalomethyl group, or a substituted or unsubstituted phenyl group, and X represents sulfur, oxygen, selenium, tellurium, or $NR^7$ wherein $R^7$ represents hydrogen, a linear or branched, saturated or unsaturated alkyl group having from 1 to 10 carbon atoms, or a substituted or unsubstituted aryl group having from 6 to 10 carbon atoms;

(P8) an electroconductive polymer comprising a repeating unit having a chemical structure represented by formula (I), wherein φ is 1,4-iminophenylene having an unsubstituted imino group;

(P9) an electroconductive polymer comprising a repeating unit having a chemical structure represented by formula (I), wherein φ is 1,4-iminophenylene with the nitrogen atom thereof having a substituent $(A^4)_{1-n}$, wherein $A^4$ represents a linear or branched, saturated or unsaturated alkyl group having from 1 to 10 carbon atoms, $A^4$ may optionally contain a carbonyl, ether, ester, thioether, amide, or sulfone bond, and 1–n is 1 or less and indicates an average substitution degree of the nitrogen atom by $A^4$ in the polymer;

(P10) an electroconductive polymer comprising a repeating unit having a chemical structure represented by formula (I), wherein φ is 2,5-pyrrolylene with the nitrogen atom thereof having a substituent $(A^4)_{1-n}$, wherein $A^4$ represents a linear or branched, saturated or unsaturated alkyl group having from 1 to 10 carbon atoms, $A^4$ may optionally contain carbonyl, ether, ester, thioether, amide, or sulfone bond, and 1–n is 1 or less and indicates an average substitution degree of the nitrogen atom by $A^4$ in the polymer; and (P11) an electroconductive polymer comprising a repeating unit having a chemical structure represented by formula (I), wherein φ is carbazolylene with the nitrogen atom thereof having a substituent $(A^4)_{1-n}$, wherein $A^4$ represents a linear or branched, saturated or unsaturated alkyl group having from 1 to 10 carbon atoms, $A^4$ may optionally contain a carbonyl, ether, ester, thioether, amide, or sulfone bond, and 1–n is 1 or less and indicates an average substitution degree of the nitrogen atom by $A^4$ in the polymer.

The present invention also provides electroconductive polymers (P5), (P6), (P7), (P8), (P9), (P10), and (P11) wherein in formula (I), δ is a value of $0<\delta\leq1$ and f is 0.

Further, the present invention provides a process for producing an electroconductive polymer represented by the above-described formula (I), which comprises condensing an electroconductive polymer comprising a repeating unit having a chemical structure represented by formula (V):

wherein
φ represents a divalent group selected from the group consisting of a divalent group of a monocyclic heterocyclic ring having from 5 to 7 members or a condensed heterocyclic ring having from 9 to 40 members, a hetero atom of the heterocyclic ring being selected from the group consisting of nitrogen, sulfur, oxygen, selenium and tellurium, a divalent group having vinylene connected with the above-described divalent group, arylene, arylenevinylene and 1,4-iminophenylene, $A^1$ represents a linear or branched, saturated or unsaturated alkylene group having from 1 to 10 carbon atoms, with one terminal thereof substituting for H of the C—H bond or the N—H bond in φ to connect with the carbon or nitrogen atom, with the proviso that when $A^1$ is not present Y or $SO_3^-M$ is connected directly to the carbon or nitrogen atom in φ, and $A^1$ may optionally contain a carbonyl, ether, ester, thioether, amide, or sulfone bond, and M represents a cation, such as $H^+$, an alkali metal ion, such as $Na^+$, $Li^+$ and $K^+$, and a substituted or unsubstituted quaternary ammonium ion, with the proviso that n ranges from 0.1 to 2 and indicates the substitution degree of φ by $A^1SO_3^-M$ in the polymer, n is 2 or less when the substituent is bonded to the carbon atom in φ, and n is 1 or less when the substituent is bonded to the nitrogen atom, with a primary- or secondary-amine, alcohol, or thiol; and a process for producing an electroconductive polymer represented by the above-described formula (II), which comprises condensing an electroconductive polymer comprising a repeating unit having a chemical structure containing a phenylenevinylene skeleton represented by formula (VI):

wherein $A^1$ represents a linear or branched, saturated or unsaturated alkylene group having from 1 to 10 carbon atoms, with one terminal thereof connecting with the oxygen atom bonded to the phenylene, with the proviso that when $A^1$ is not present $SO_3^-M$ is bonded directly to the oxygen atom, $A^2$ and $A^3$ each independently represents hydrogen or a linear or branched, saturated or unsaturated alkyl group having from 1 to 10 carbon atoms, $A^1$, $A^2$ or $A^3$ may optionally contain a carbonyl, ether, ester, thioether, amide, or sulfone bond, and M represents a cation, such as $H^+$, an alkali metal ion, such as $Na^+$, $Li^+$ and $K^+$, and a substituted or unsubstituted quaternary ammonium ion, with the proviso that n ranges from 0.1 to 1 and indicates an average substitution degree of the phenylene by $OA^1SO_3^-M$ in the polymer, with a primary- or secondary-amine, alcohol, or thiol.

Furthermore, the present invention provides an electroconductive molded article using electroconductive polymer (P1), (P2), (P3), (P4), (P5), (P6), (P7), (P8), (P9), (P10), or (P11) as a starting material.

In the electroconductive polymer comprising a repeating unit having a chemical formula represented by the above-described formula (I) or (II), δ is 1 or less, preferably 0.7 or less, and indicates an average charge number of all charges in the polymer main chain per repeating unit. When δ is 0, a chemical structure in which the π-conjugated main chain is in a neutral state (non-charged state) is provided, and in this case, δf/j in formula (VII):

$$(Z)_{\delta f/j} \qquad (VII)$$

is 0 and the anion Z is not present.

On the other hand, when δ is greater than 0 but not more than 1 (i.e., 0<δ≦1), a p-type doping state (charged state) is provided in which the π-conjugated main chain is oxidized. Accordingly, in this case, (Z) is present as a counter anion in a proportion corresponding to δf/j per repeating unit in the electroconductive polymer.

When δ is a value of 0<δ≦1 and f is 0, the π-conjugated main chain shows an oxidized p-type self-doping state (charged state). In this case, the anion Z is not present, and $SO_3^-$ in the substituent serves as a counter anion.

In formula (I), the substituent $A^1SO_3^-$ $(M)_f$ is $A^1SO_3^-M$ when f is 1, and $A^1SO_3^-$ when f is 0. Further, in formula (II), the substituent $OA^1SO_3^-(M)_f$ is $OA^1SO_3^-M$ when f is 1, and $OA^1SO_3^-$ when f is 0. When f is 0, k is equal to δ.

In formula (I), φ represents a divalent group selected from the group consisting of a divalent group of a monocyclic heterocyclic ring having from 5 to 7 members or a condensed heterocyclic ring having from 9 to 40 members, a hetero atom of the heterocyclic ring being selected from the group consisting of nitrogen, sulfur, oxygen, selenium and tellurium, a divalent group having vinylene connected with the above-described divalent group, arylene, arylenevinylene, and 1,4-iminophenylene as a divalent group represented by formula (VIII);

(VIII)

Examples of the divalent group of a monocyclic heterocyclic ring include 2,5-thienylene, 2,5-furylene, 2,5-pyrrolylene, N-substituted-2,5-pyrrolylene, 2,5-selenylene, 2,5-tellurylene, pyridinediyl, pyrazinediyl, and pyrimidinediyl.

Examples of the divalent group of a condensed heterocyclic ring include thienothienylene, pyrrolopyrrolylene, dithienothienylene, isothianaphthenylene, isoindolylene, isobenzofurylene, isobenzoindolylene, isobenzoselenylene, isobenzotellurylene, quinolylene, isoanthracenothienylene, isoanthracenofurylene, isoanthracenopyrrolylene, isoanthracenoselenylene, isoanthracenotellurylene, carbazolylene, and N-substituted-carbazolylene.

Examples of the divalent group having vinylene connected with the divalent group of a monocyclic heterocyclic ring or a condensed heterocyclic ring include thienylenevinylene, pyridinediylvinylene, pyrazinediylvinylene, pyrimidinediylvinylene, and isothianaphthenylenevinylene.

Examples of the arylene include phenylene, naphthylene, anthracylene, phenanthrylene, and azulylene.

Examples of the arylenevinylene include phenylenevinylene and naphthylenevinylene.

Examples of the 1,4-iminophenylene include 1,4-iminophenylene and N-substituted-1,4-iminophenylene.

φ is, however, not restricted to the above examples of the divalent group, and may be any aromatic or heterocyclic divalent group having a φ-conjugated main chain.

$A^1$ represents a linear or branched, saturated or unsaturated alkylene group having from 1 to 10 carbon atoms, and $A^1$ may optionally contain a carbonyl, ether, ester, thioether, amide, or sulfone bond. Specific examples of $A^1$ include methylene, ethylene, trimethylene, propylene, tetramethylene, 1,1-dimethylethylene, pentamethylene, hexamethylene, heptamethylene, octamethylene, nonamethylene, decamethylene, $-O(CH_2)_2-$, $-O(CH_2)_2O(CH_2)_2-$, $-O(CH_2)_2O(CH_2)_2O(CH_2)_2-$, $-S(CH_2)_2-$, $-S(CH_2)_2S(CH_2)_2-$, $-S(CH_2)_2S(CH_2)_2S(CH_2)_2-$, $-C(=O)CH_2-$, $-C(=O)CH_2CH_2-$, $-C(=O)CH_2CH_2CH_2-$, $-C(=O)(CH_2)_4-$, $-C(=O)(CH_2)_5-$, $-NHC(=O)CH_2-$, $-NHC(=O)(CH_2)_2-$, $-NHC(=O)(CH_2)_3-$, $-NHC(=O)(CH_2)_4-$, $-NHC(=O)(CH_2)_5-$, $-OC(=O)CH_2-$, $-OC(=O)(CH_2)_2-$, $-OC(=O)(CH_2)_3-$, $-OC(=O)(CH_2)_4-$, $-OC(=O)(CH_2)_5-$ and $-(CH_2)_2-OC(=O)(CH_2)_2-$.

$A^2$, $A^3$, and $A^4$ each independently represents hydrogen or a linear or branched, saturated or unsaturated alkyl group, with the exception that $A^4$ is not H. $A^2$, $A^3$ or $A^4$ may optionally contain a carbonyl, ether, ester, thioether, amide or sulfone bond. Specific examples of $A^2$, $A^3$ and $A^4$ include methyl, ethyl, propyl, isopropyl, butyl, tert-butyl, pentyl, hexyl, heptyl, octyl, nonyl, decyl, ethoxyethyl, and methoxyethyl groups.

In formulae (I) and (II), Y represents $SO_2NR^1R^2$, $SO_3R^3$ or $SO_2SR^4$, wherein $R^1$ and $R^2$ each independently represents hydrogen, a linear or branched, saturated or unsaturated alkyl group having from 1 to 20 carbon atoms, preferably from 1 to 12 carbon atoms, or a substituted or unsubstituted aryl group having from 4 to 30 carbon atoms, preferably from 6 to 12 carbon atoms, $R^3$ and $R^4$ each independently represents a linear or branched, saturated or unsaturated alkyl group having from 1 to 20 carbon atoms, preferably from 1 to 12 carbon atoms, or a substituted or unsubstituted aryl group having from 6 to 20 carbon atoms, preferably from 6 to 12 carbon atoms. Examples of the substituents for the substituted aryl groups include methyl, ethyl, halogen atom, such as chlorine, bromine, fluorine, trifluoromethyl, cyano group, methoxy, and ethoxy. Specific examples of $R^1$ and $R^2$ include hydrogen, methyl, ethyl, propyl, allyl, isopropyl, butyl, 1-butenyl, tert-butyl, pentyl, hexyl, heptyl, octyl, nonyl, decyl, undecyl, dodecyl, ethoxyethyl, methoxyethyl, acetonyl, acetyl, phenyl, chlorophenyl, tolyl, xylyl, naphthyl, phenoxy, p-diphenyleneoxy and p-alkoxydiphenyleneoxy groups. $R^1$ and $R^2$ may combine with each other to form a divalent saturated or unsaturated hydrocarbon chain which, together with the nitrogen atom, forms a heterocyclic structure, and examples thereof are butylene, pentylene, hexylene, and butadienylene.

Examples of $R^3$ and $R^4$ include methyl, ethyl, propyl, allyl, isopropyl, butyl, 1-butenyl, tert-butyl, pentyl, hexyl, heptyl, octyl, nonyl, decyl, undecyl, dodecyl, ethoxyethyl, methoxyethyl, acetonyl, acetyl, phenyl tolyl, xylyl, and naphthyl groups.

In formulae (I) and (II), M represents $H^+$, an alkali metal ion, such as $Na^+$, $Li^+$, $K^+$, or an alkyl- or aryl-substituted or unsubstituted cation of a Group Vb element, such as a quaternary ammonium ion, such as $NH_4^+$, $N(CH_3)_4^+$, $N(C_6H_5)_4^+$. An example of Z is an electrolytic anion, and specific examples thereof include a halogenated anion of a Group Vb element, such as $PF_6^-$, $SbF_6^-$ and $AsF_6^-$, a halogenated anion of a Group IIIb element, such as $BF_4^-$, a halogen anion, such as $I^-$ ($I_3^-$), $Br^-$ and $Cl^-$, a perhalogenate anion, such as $ClO_4^-$, a Lewis acid anion, such as $AlCl_4^-$, $FeCl_4^-$ and $SnCl_5^-$, and a protonic acid anion, such as an inorganic acid anion, such as $NO_3^-$ and $SO_4^{2-}$, an organic sulfonic acid anion, such as p-toluene sulfonic acid anion, $CF_3SO_3^-$, $CH_3SO_3^-$, and a carboxylic acid anion, such as $CH_3COO^-$ and $C_6H_5COO^-$. Another example of Z is a polyelectrolytic anion, such as polyacrylic acid, polymethacrylic acid, polyvinylsulfuric acid, polyvinylsulfonic acid, polystyrenesulfonic acid, poly-α-methylsulfonic acid, polyethylenesulfonic acid, and polyphosphoric acid. Still other examples of Z are a fluorine-based carboxylic acid or sulfonic acid, and a fluorine-based polyelectrolytic anion. The present invention is, however, not restricted to these anions. A plurality of anions may be present together. j is a positive number equal to the absolute value of the valence number of the above-described anion Z.

In formula (I), k represents an average substitution degree of φ by the substituent $A^1SO_3^-(M)_f$ in the polymer that is, an averaged number of the substituent per φ as averaged for all φ in the polymer, and is in the range of from 0 to 1.9. m represents an average substitution degree of φ by the substituent $A^1Y$ in the polymer, that is, an averaged number of the substituent per φ as averaged for all φ in the polymer, and is in the range of from 0.1 to 2, preferably from 0.4 to 1.3. When these substituents are bonded to the carbon atom in φ, k+m is 2 or less, and when bonded to the nitrogen atom, k+m is 1 or less.

Also in formula (II), k represents an average substitution degree of the phenylene by the substituent $OA^1SO_3^-(M)_f$ in the polymer, that is, an averaged number of the substituent per phenylene as averaged for all phenylenes in the polymer, and is in the range of from 0 to 0.9. m represents an average substitution degree of the phenylene by the substituent $OA^1Y$ in the polymer, that is, an averaged number of the substituent per phenylene as averaged for all phenylenes in the polymer, and is in the range of from 0.1 to 1. k+m is 1 or less, accordingly, one phenylene does not simultaneously contain two substituents selected from the group consisting of $OA^1Y$, $OA^1SO_3^-(M)_f$ and $OA^2$.

The substituents $R^5$ and $R^6$ of the electroconductive polymer comprising a chemical structure represented formula (III) or (IV) may be any group as long as it does not inhibit the reaction, such as the above-described sulfonamide formation, esterification of the sulfonic acid, and thioesterification of the sulfonic acid, and each is independently selected from hydrogen, a linear or branched, saturated or unsaturated alkyl or alkoxy group having from 1 to 20 carbon atoms, a halogen, a nitro group, a primary-, secondary-, or tertiary-amino group, a trihalomethyl group, and a substituted or unsubstituted phenyl group. The alkyl or alkoxy group having from 1 to 20 carbon atoms may optionally contain a carbonyl, ether, ester, thioether, amide or sulfone bond. Examples of the substituents for the substituted phenyl group include methyl, ethyl, halogen atom, such as chlorine, bromine, fluorine, trifluoromethyl, cyano group, methoxy, and ethoxy.

Useful examples of $R^5$ and $R^6$ include hydrogen, an alkyl group, an alkoxy group, a halogen, and a substituted or unsubstituted phenyl group. Specific examples of these substituents include an alkyl group, such as methyl, ethyl propyl, allyl, isopropyl, butyl, 1-butenyl, pentyl, hexyl, octyl, decyl, dodecyl, ethoxyethyl, methoxyethoxyethyl, acetonyl, and phenacyl, an alkoxy group, such as methoxy, ethoxy, propoxy, isopropoxy, butoxy, pentyloxy, hexyloxy, octyloxy, dodecyloxy, methoxyethoxy, and 2-(2-methoxyethoxy)ethoxy, a halogen group, such as fluoro, chloro, and bromo, and a substituted phenyl group, such as a fluorophenyl group, a chlorophenyl group, a bromophenyl group, and a methylphenyl group.

In formula (III) or (IV), X represents a hetero atom or nitrogen having $R^7$ such as sulfur, oxygen, selenium, tellurium, or $NR^7$. In other words, the chemical structure represented by formula (III) includes a divalent group having a isothianaphthenylene, isobenzofurylene, isobenzoselenylene, isobenzotellurylene, or isoindolylene skeleton. The chemical structure represented by formula (IV) includes a divalent group having a thienylene, furylene, selenylene, tellurylene, or a pyrrolylene skeleton.

$R^7$ represents a linear or branched alkyl group having from 1 to 10 carbon atoms or a substituted or unsubstituted aryl group having 6 to 10 carbon atoms, and it may optionally contain a carbonyl, ether, ester, thioether, amide, or a sulfone bond. Examples of the substituents for the substituted aryl group include methyl, ethyl, halogen atom, such as chlorine, bromine, florine, trifluoromethyl, cyano group, methoxy, and ethoxy. Specific examples of $R^7$ include hydrogen, methyl, ethyl, propyl, allyl, isopropyl, butyl, tert-butyl, pentyl, hexyl, ethoxyethyl, methoxyethyl, acetonyl, acetyl, phenyl, tolyl, and xylyl.

The processes for producing electroconductive polymers (P1) to (P11) according to the present invention will be described below in detail. The production process of the present invention is a process for producing a practically useful and novel π-conjugated electroconductive polymer by condensing an amine, an alcohol, or a thiol onto an electroconductive polymer comprising a repeating unit having a chemical structure represented by formula (V), or an electroconductive polymer comprising a repeating unit having a chemical structure containing a phenylenevinylene skeleton represented by formula (VI), in the presence or absence of a solvent.

The electroconductive polymer comprising a repeating unit having a chemical structure represented by formula (V) or (VI) for use in the production process of the present invention can be prepared by known methods. Examples of the known methods include that described in *J. Amer. Chem. Soc.*, 112, 2800 (1990), and *Macromolecules*, 23, 2119 (1990).

In the process for producing the above-described electroconductive polymer (P1), (P2), (P5), (P6), (P7), (P8), (P9), (P10), or (P11) by the condensation of a primary- or secondary-amine, an alcohol, or a thiol onto an electroconductive polymer comprising a repeating unit having a chemical structure represented by formula (V), the conversion ratio of the $A^1SO_3^-M$ group in the electroconductive polymer comprising a repeating unit having a chemical structure represented by formula (V) as a starting material into the $A^1Y$ group through the reaction with an amine, an alcohol, or a thiol can be controlled by controlling the reaction conditions, such as the charging molar ratio of the starting material compounds used in the reaction, the reaction time, and the reaction temperature. Accordingly, the $A^1SO_3^-M$ group of the starting material polymer can be caused to remain in a desired proportion. In other words, in the electroconductive polymer (P1), (P2), (P5), (P6), (P7), (P8), (P9), (P10), or (P11), the residual ratio of the substituent $A^1SO_3^-(M)_f$ in $\phi$ of the polymer, that is, the average substitution degree k of $\phi$ by the substituent, can be set in the range of from 0 to 1.9 when the substituent is bonded to the carbon atom of $\phi$, and in the range of from 0 to 0.9 when the substituent is bonded to the nitrogen atom of $\phi$. Alternatively, the conversion degree to the substituent $A^1Y$, that is, the average substitution degree m of $\phi$ by $A^1Y$ in the polymer can be set in the range of from 0.1 to 2 when the substituent is bonded to the carbon atom of $\phi$, and in the range of from 0.1 to 1 when the substituent is bonded to the nitrogen atom of $\phi$. k+m is 2 or less when the substituent is bonded to the carbon atom of $\phi$, and k+m is 1 or less when bonded to the nitrogen atom.

In the process for producing the electroconductive polymer (P3) or (P4) by the condensation of a primary- or secondary-amine, an alcohol, or a thiol to an electroconductive polymer comprising a repeating unit having a chemical structure containing a phenylenevinylene skeleton represented by formula (VI) according to the present invention, the conversion ratio of the $OA^1SO_3^-M$ group in the electroconductive polymer comprising a repeating unit having a chemical structure containing a phenylenevinylene skeleton represented by formula (VI) as a starting material into the $OA^1Y$ group through the reaction with an amine, an alcohol, or a thiol can be controlled by controlling the reaction conditions, such as the charging molar ratio of the starting material compounds used in the reaction, the reaction time, and the reaction temperature. Accordingly, the $OA^1SO_3^-M$ group of the starting material polymer can be caused to remain in a desired proportion. In other words, in the electroconductive polymer (P3) or (P4), the residual ratio of the substituent $OA^1SO_3^-(M)_f$ in the phenylenevinylene of the polymer, that is, the average substitution degree k of the phenylenevinylene by the substituent can be set in the range of from 0 to 0.9. Alternatively, the conversion degree to the substituent $OA^1Y$, that is, the average substitution degree m of the phenylenevinylene by $OA^1Y$ in the polymer can be set in the range of from 0.1 to 1. k+m is 1 or less.

The amines used in the processes for producing the electroconductive polymers (P1) to (P11) by the condensation as described above include a primary- or secondary-amine having (i) a linear or branched, saturated or unsaturated alkyl group having from 1 to 20 carbon atoms, preferably from 1 to 12 carbon atoms, (ii) a substituted or unsubstituted aryl group having from 4 to 30 carbon atoms, preferably from 6 to 12 carbon atoms, or (iii) a substituted or unsubstituted, saturated or unsaturated cyclic amine having from 2 to 10 carbon atoms, preferably from 4 to 9 carbon atoms. Examples of the substituents for the substituted aryl group and substituted cyclic amine include methyl, ethyl, halogen atom, such as chlorine, bromine, fluorine, trifluoromethyl, cyano group, methoxy, and ethoxy. Specific examples of the above-described amines include methylamine, ethylamine, propylamine, allylamine, isopropylamine, butylamine, tert-butylamine, pentylamine, hexylamine, octylamine, dodecylamine, dimethylamine, diethylamine, dipropylamine, dibutylamine, dipentylamine, dihexylamine, dioctylamine, methylethylamine, methylpropylamine, methylbutylamine, aniline, chloroaniline, aminonaphthalene, diphenylamine, piperidine, homopiperidine, pyrrole, toluidine, xylidine, anisidine, 2-furanamine, benzylamine, phenethylamine, phenylpropylamine, ethyleneimine, piperidine-aldehyde, N-methylpiperazine, pyrrolidine, pirroline, morpholine, indole, isoindole, indoline, isoindoline, indazole, purine, carbazole, phenothiazine, phenoxazine, cyclopropylamine, cyclobutylamine, cyclobutenylamine, cyclopentylamine, cyclopentenylamine, cyclopentadienylamine, cyclohexylamine, cyclohexenylamine, cycloheptylamine, cycloheptenylamine and cycloheptadienylamine.

The alcohols used in the processes for producing the electroconductive polymers (P1) to (P11) by the condensation as described above include an alcohol having a linear or branched, saturated or unsaturated alkyl group having from 1 to 20 carbon atoms, preferably from 1 to 12 carbon atoms, or an aromatic compound having from 6 to 20 carbon atoms, preferably from 6 to 12 carbon atoms, which is substituted with a hydroxyl group. Specific examples thereof include methanol, ethanol, propanol, allyl alcohol, isopropanol, butanol, tert-butanol, pentanol, hexanol, octanol, allyl alcohol, benzyl alcohol, phenetyl alcohol, phenylpropyl alcohol, phenol, cresol, xylenol, and naphthol.

The thiols used in the processes for producing the electroconductive polymers (P1) to (P11) by the condensation as described above include a mercaptan compound having a linear or branched, saturated or unsaturated alkyl group having from 1 to 20 carbon atoms, preferably from 1 to 12 carbon atoms, or an aromatic compound having from 6 to 20 carbon atoms, preferably from 6 to 12 carbon atoms, which is substituted with a thiol group. Specific examples thereof include methanethiol, ethanethiol, propanethiol, butanethiol, pentanethiol, hexanethiol, octanethiol, thiophenol, and naphthalenethiol.

The concentration of the starting material polymer used in the processes for producing the electroconductive polymers (P1) to (P11) by the condensation as described above may vary depending upon the kind of polymer or other reaction conditions, but, in general, it is preferably from $1 \times 10^{-4}$ to $1 \times 10^1$ mol/liter, more preferably from $1 \times 10^{-3}$ to 5 mol/liter, in terms of the concentration of $A^1SO_3^-M$ or $OA^1SO_3^-M$ as the reacting group in the starting material polymer.

The concentration of an amine, alcohol, and/or thiol used in the above-described production processes may be optionally determined according to the desired amount of a sulfonamide bond, or a sulfonic acid ester and/or thioester bond incorporated into the polymer to be produced. The concentration employed may vary depending upon the kind of amine, alcohol, and/or thiol, the kind of starting material polymer, the reaction solvent, or other reaction conditions, but in general, they are preferably used in an amount corresponding to from $1 \times 10^{-1}$ to $1 \times 10^2$ mol/mol, more preferably from $1 \times 10^{-1}$ to $1 \times 10^1$ mol/mol, of the above-described reacting group in the starting material polymer.

The temperature in the above-described production processes is determined according to the kind of amine, alcohol, and/or thiol used, the kind of starting material polymer, the reaction solvent, or other reaction conditions and is not particularly restricted, but in general, it is preferably from $-80°$ C. to $300°$ C. more preferably from $5°$ C. to $200°$ C.

The reaction time in the above-described production processes varies depending upon the kind of amine, alcohol, and/or thiol used, the kind of starting material polymer, the reaction solvent, or other reaction conditions and is not particularly restricted, but usually, it is preferably from 0.01 to 200 hours, more preferably from 0.1 to 40 hours.

The reaction pressure in the above-described production processes varies depending upon the kind of amine, alcohol, and/or thiol used, the kind of starting material polymer, the reaction solvent, or other reaction conditions and is not particularly restricted, but usually, it is preferably from 1 to several atms. In particular, when an amine or a thiol is used in the reaction, the production is preferably conducted under an inert gas atmosphere, such as nitrogen and argon, so as to prevent the deterioration of the amine or the thiol due to oxidation.

In the above-described production processes, the reaction may be conducted in the presence or absence of a solvent, and in the case of using a solvent, any solvent may be used as long as it dissolves amines, alcohols, and/or thiols, or the starting material polymer, and does not inhibit the condensation reaction, although it is not particularly restricted because its effects vary depending upon the kind and concentration of the starting material polymer, amines, alcohols, and/or thiols used and other reaction conditions. Examples of the solvent include water, dimethylformamide (DMF), dimethylacetamide, N-methyl-2-pyrrolidone (NMP), dimethylsulfoxide (DMSO), sulfolane, propylene carbonate (PC), acetonitrile, benzonitrile, nitromethane, and acetic acid. A mixed solvent of these may also be used. Amines, alcohols, and/or thiols used may serve also as a solvent.

In the above-described production processes, some kinds of amines, alcohols, and/or thiols used as a starting material may be incorporated into the reaction system in a gaseous state to react with the starting material polymer. For example, methylamine, ethylamine, dimethylamine or methanethiol may be used in such a manner.

In the above-described production processes, water is produced as the reaction proceeds. Therefore, a dehydrating agent may be present to accelerate the reaction. The dehydrating agent is not particularly restricted as long as it does not inhibit reactions to be effected, such as amidation, esterification and thio-esterification. Examples of dehydrating agents include anhydrous calcium chloride, anhydrous sodium sulfate, and anhydrous magnesium sulfate. The amount of dehydrating agent is not particularly restricted, but in general the amount is 0.01 to 5 molar equivalent to the amount of reacting $A^1SO_3^-M$ group, preferably 0.1 to 2 molar equivalent to the amount of reacting $A^1SO_3^-M$ group.

The electroconductive polymer comprising a chemical structure represented by formula (I) or (II) may be organic solvent-soluble as well as water-soluble, but when the polymer is water-soluble, it is isolated or purified by ultrafiltration, dialysis or ion exchange. Further, the polymer may also be purified by reprecipitation, for example, from ether and dioxane, using conventional means.

In formulae (I), (II), (V) and (VI), M represents $H^+$, an alkali metal ion (e.g., $Na^+$, $Li^+$, $K^+$), or an alkyl- or aryl-substituted or unsubstituted cation of a Group Vb element, such as a quaternary ammonium ion (e.g., $NH_4^+$, $N(CH_3)_4^+$, $N(C_6H_5)_4^+$) as described above, and conversion of the cation to another desired cation is effected by conventional ion-exchange, or by reacting a base capable of forming another cation with the polymer wherein M is $H^+$. Further, in formulae (I), (II), (V) and (VI), M is not restricted to a single cation, but may be a plurality of cations.

The electroconductive polymers (P1) to (P11) wherein k is 0 is water-insoluble, and becomes organic solvent-soluble due to the side chain, such as a sulfonamide or a sulfonic acid ester. The larger the residual degree k of $A^1SO_3^-(M)_p$, the greater the water solubility of the polymer, and depending upon the case, the polymer exhibits both water-solubility and organic solvent-solubility.

The electroconductive polymers (P1) to (P11) comprising a repeating unit having a chemical structure represented by formula (I) or (II), wherein δ is 0, that is, polymers having a π-conjugated main chain in a neutral state (non-charged state), can be converted to a soluble electroconductive polymer having an oxidized π-conjugated main chain in a p-type doping state (charged state) to extremely enhance the electroconductivity by electrochemical or chemical oxidation (p-type doping) of the polymer to render δ larger than 0, but not more than 1 (0<δ≦1). Alternatively, the electroconductive polymer in a p-type doping state may be converted to an electroconductive polymer in a neutral state (δ is 0) or any doping state (0<δ≦1), by electrochemical or chemical reduction. As such, the electroconductive polymers (P1) to (P11) can be reversibly doped or de-doped by the oxidation or reduction reaction.

In the electroconductive polymers (P1) to (P11) comprising a repeating unit having a chemical structure represented by formula (I) or (II), wherein f is 0 and δ is larger than 0 but not more than 1 (0<δ≦1), δf/j in formula (VII) is 0, an anion Z is not present, and the substituents $(A^1SO_3^-(M)_p)_k$ and $(OA^1SO_3^-(M)_p)_k$ are respectively represented by formula (IX):

$$(A^1SO_3^-)_δ \quad (IX)$$

and formula (X):

$$(OA^1SO_3^-)_δ \quad (X)$$

that is, the electroconductive polymers (P1) to (P11) each is a polymer in a self-doped state due to $SO_3^-$ contained in the substituent. The concept of the self-doping in a 5-membered heterocyclic polymer is described in detail in *Synthetic Metals*, vol. 30, p. 305, 1989. An experiment on the polymer of the present invention has proven that a polymer having an $SO_3^-M$ group, such as the electroconductive polymer comprising a repeating unit having a chemical structure represented by formula (I) or (II), possesses a self-doping ability and can be converted into a self-doped state by an electrochemical redox reaction. Namely, such a polymer having a self-doping ability as described above can be reversibly doped or de-doped by an electrochemical or chemical oxidation or reduction reaction.

The doping method may be any known electrochemical or chemical doping method. An example of the electrochemical doping method is a method wherein an electroconductive polymer is interposed between electrodes and doped in a solution containing a dopant. An example of the chemical doping method is a gas phase method wherein a dopant, such as iodine, is reacted with an electroconductive polymer film in a gaseous phase (see *Doudensei Koubunshi no Kiso to Ouyou—Gousei, Bussei, Hyouka, Ouyou-Gijutsu*, IPC K. K., 1988). As the dopant used herein, anions described for Z are used.

The electroconductive polymer having a polar substituent, such as a sulfonamide group, a sulfonic acid ester group, and a sulfonic acid thioester group according to the present invention is a novel substance. In particular, the electroconductive polymer (P6) having a polyisothianaphthene structure, wherein X is sulfur has an energy gap as low as about 1.1 eV, and shows a high electroconductivity at a low doping level.

In the production processes of the electroconductive polymers (P1) to (P11) of the present invention, a polymer comprising both the chemical structure in a neutral state (δ=0) and the chemical structure in a doping state (0<δ≦1) in the same polymer chain may be formed depending upon the reaction conditions. By applying an electrochemical or chemical redox reaction to the polymer obtained, a polymer comprising the chemical structure in a neutral state, and the chemical structure in a doped state in the same molecule, and in a desired proportion, can be obtained.

The electroconductive polymers (P1) to (P11) include a copolymer comprising other π-electron conjugated repeating units in a desired proportion. Examples of the other π-electron conjugated repeating units include, but are not limited to, isothianaphthenylene, isobenzofurylene, isobenzoindolylene, isobenzoselenylene, isobenzotellurylene, 2,5-thienylene, 2,5-pyrrolylene, 2,5-furylene, 2,5-selenylene, 2,5-tellurylene, iminophenylene, phenylene, naphthylene, anthracylene, phenanthrylene, azulylene, pyridinediyl, pyrazinediyl, pyrimidinediyl, quinolylene, isonaphthothienylene, isonaphthofurylene, isonaphthopyrrolylene, isonaphthoselenylene, isonaphthotellurylene, isoanthracenothienylene, isoanthracenofurylene, isoanthracenopyrrolylene, isoanthracenoselenylene, isoanthracenotellurylene, thienothienylene, pyrrolopyrrolylene, dithienothienylene, vinylene, and ethynylene (or acetylene) structures. The copolymer is easily produced by the production process of the present invention using, as a starting material, an electroconductive polymer having a copolymer structure which comprises a repeating unit having a structure described above produced in the presence of a monomer giving the above-described structure, and a repeating unit having a chemical structure represented by formula (V) or (VI).

The electroconductive polymers (P1) to (P11) of the present invention exhibit excellent solubility in an organic solvent or water. The polymers may exhibit a gel state depending upon the kind of the substituent, and thus, the solubility or affinity to various solvents can be varied by changing the substituent.

By taking advantage of the electroconductive polymers (P1) to (P11) being soluble in an organic solvent or water as described above, a film (for example, obtained by a spin-casting process), a linear molded article, a stick, platy, or sheet-like molded article, or other solid molded articles, can be easily produced therefrom by conventional molding and film-forming methods in the polymer industry. Further, the molded articles obtained maintain the electroconductive state very stably.

The concentration of the electroconductive polymer used in the above-described molding and film-forming methods varies depending upon the molding state, the chemical structure of the polymer and the solvent used, and cannot be absolutely determined, but in general, it is preferably from 0.01 to 60 wt %. The molding is in many cases carried out in an inert gas atmosphere or in vacuum, but also preferably carried out in an air atmosphere. The polymer solution is shaped into a desired form by placing the solution on an appropriate medium, for example, a glass plate or a sodium bromide disc, and then forming it into a film, or by forming a fiber or other solid articles directly from the solution. The polymer can also be stretched.

The polymer is dissolved or mixed together with other general-use resins, such as polystyrene, polyvinyl alcohol, polyacrylate and polymethacrylate, and formed into a molded article having a desired compositional ratio. The resin is usually used in a weight of preferably from 10 to 500% based on the electroconductive polymer. The solvent used in this case is preferably a polar organic solvent, such as dimethylformamide, N-methyl-2-pyrrolidone and dimethylsulfoxide, or water, but is not particularly restricted as long as the solvent dissolves the resin and the electroconductive polymer, and a mixed solvent system may also be used.

The electroconductive polymers (P1) to (P11) of the present invention are organic solvent-soluble and/or water-soluble, and are novel materials having excellent processability. Further, due to their high conductivity, they can be suitably used as an electroconductive material, an electrode, a sensor, or an antistatic material individually or as a composite material. Furthermore, since they are thermally and mechanically stable, they can also be used as a hitherto unknown novel material, in an electric and electronic field, and as a semiconductor electronic device. Still further, excellent processes for producing the electroconductive polymers (P1) to (P11) are provided in the present invention.

The present invention will now be described in greater detail with reference to Examples, but the present invention should not be construed as being limited to these Examples.

EXAMPLE 1

Electroconductive Polymers (P1) [$\phi$=isothianaphthenylene, $A^1$=nil, $Y=C_8H_{17}NHSO_2$, m=0.7, f=1, k=0, $\delta$=0], and (P6) [$A^1$=nil, $R^5=R^6$=H, $Y=C_8H_{17}NHSO_2$, m=0.7, f=1, k=0, X=S, $\delta$=0]

500 mg of 1,3-dihydroisothianaphthene was gradually added to 4.0 ml of a sulfuric acid solution containing 2.0 ml of fuming sulfuric acid (20%, $SO_3$) with stirring at room temperature, followed by stirring overnight. The reaction solution turned red. Thereafter, the reaction solution was heated at 90° C., and at once turned deep dark blue, and after 3 hours, it became a deep blue homogeneous solution.

The reaction mixture was heated at the same temperature for 2 hours more with stirring, and then added to 1,000 ml of water. The solution was adjusted to a pH of 1.9 with HCl, purified through an ultrafiltration membrane, and then concentrated to 100 ml. After distilling off the water under reduced pressure, the concentrate was vacuum dried to provide 390 mg of a black polymer ($A^1$=nil, $R^5=R^6$=H, n=0.7, $M=H^+$) comprising a chemical structure wherein $\phi$ of formula (V) is represented by formula (III).

0.25 g of the polymer obtained above and 0.15 g (1.16 mmol) of n-octylamine were added to 20 ml of N-methyl-2-pyrrolidone (NMP), and reacted with stirring for 6 hours at 160° C. under a nitrogen atmosphere. After completion of the reaction, the reaction solution was added to 200 ml of 1,4-dioxane and a precipitate was obtained. The precipitate was separated by filtration, dissolved in 20 ml of N,N-dimethylformamide, and the resulting solution was added to 200 ml of 1,4-dioxane to reprecipitate. This operation was repeated twice. The thus obtained precipitate was separated by filtration, rinsed with 200 ml of water and 200 ml of acetone, and then vacuum dried to obtain 0.26 g of a deep blue polymer.

Figure 1:
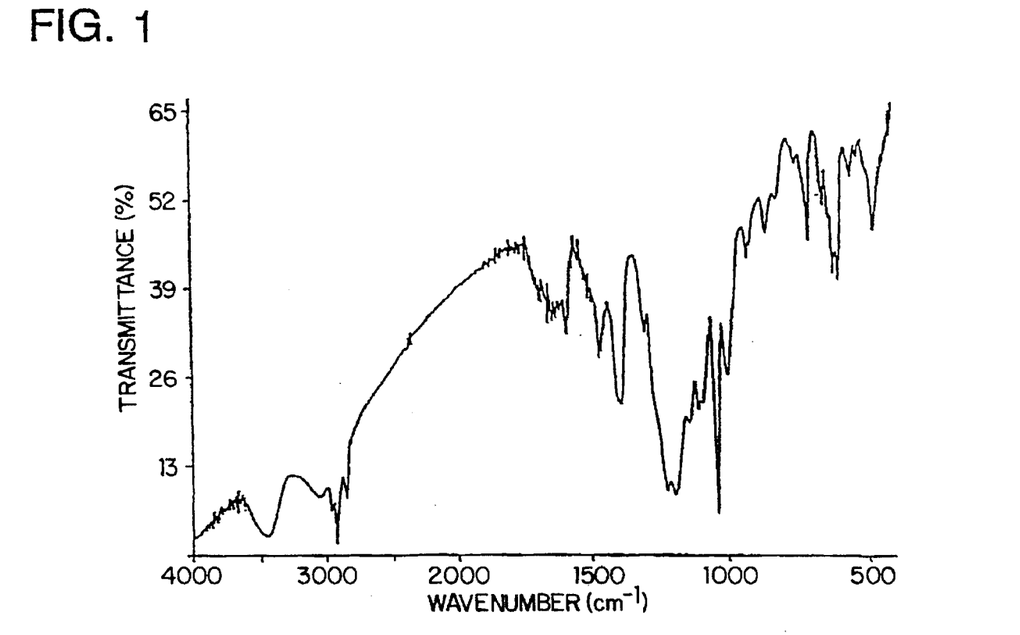
FIG. 1 is the infrared absorption spectrum of the polymer obtained in Example 1.

The infrared absorption spectrum (KBr method) of the resulting polymer is shown in FIG. 1. The characteristic absorptions found were as follows.

2924w, 2854w, 1586w, 1466w, 1389m, 1217s, 1190s, 1139w, 1106w, 1038s, 998m, 923w, 851w, 704m, 622m, 603m ($cm^{-1}$)

Figure 2:
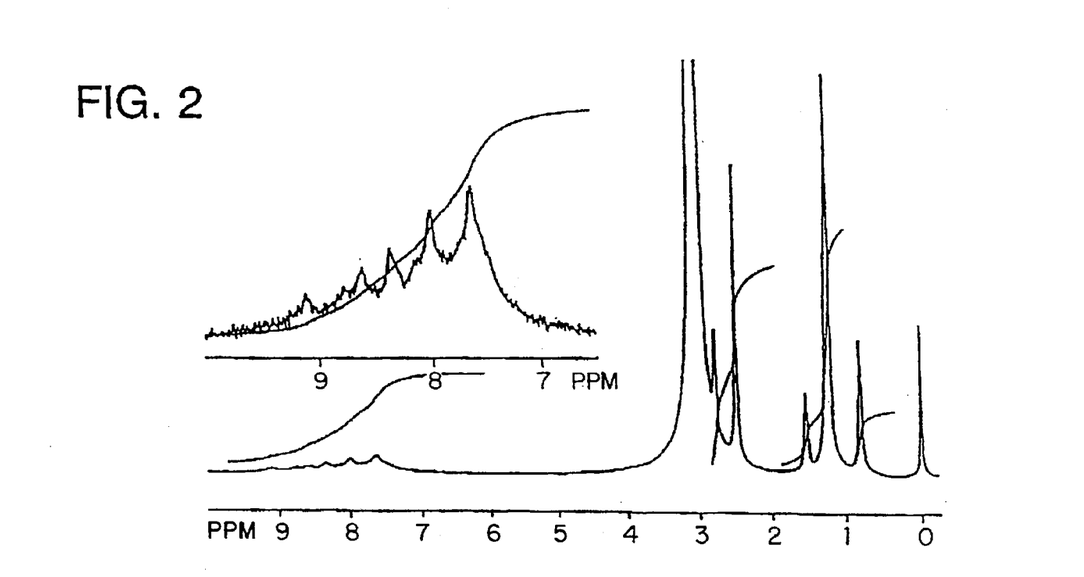
FIG. 2 is the $^1$H-NMR spectrum of the polymer obtained in Example 1 in DMSO-d6.
Figure 3:
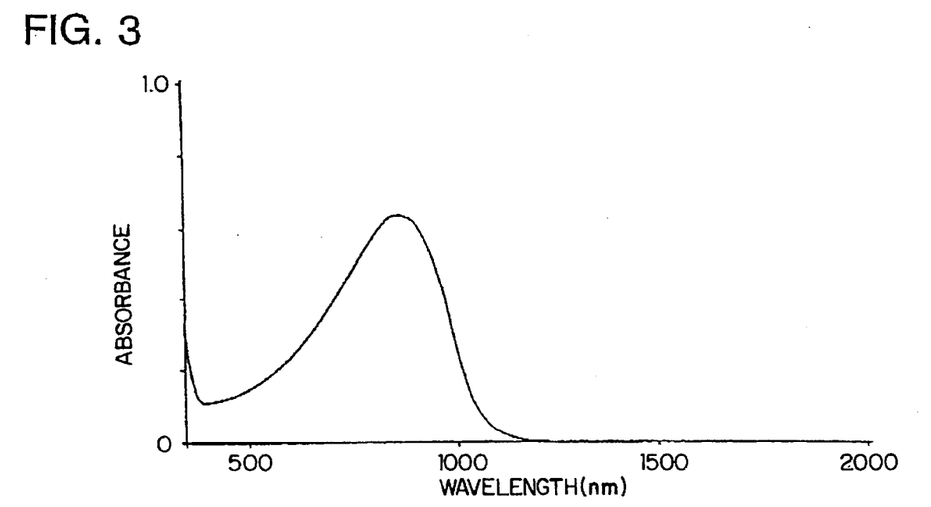
FIG. 3 is the visible near infrared absorption spectrum of the polymer obtained in Example 1 in DMF.

$^1$H-NMR spectrum in dimethylsulfoxide (DMSO-d6), and the visible near infrared absorption spectrum in DMF are shown in FIG. 2 and FIG. 3, respectively. The polymer obtained was soluble in NMP, DMSO, dimethylformamide (DMF), and N,N-dimethylacetamide (DMA), but insoluble in water.

Elemental analysis for $(C_8H_4S)_{0.3}(C_{16}H_{21}NS_2O_2)_{0.7}$:

|  | C | H | N | S |
|---|---|---|---|---|
| Fond (%) | 60.82 | 5.85 | 3.66 | 19.95 |
| Calcd. (%) | 61.39 | 6.02 | 3.69 | 20.48 |

The electroconductivity of the polymer was $7\times10^{-7}$ S/cm.

EXAMPLE 2

Electroconductive Polymers (P1) [φ=isoindolylene, $A^1$=nil, Y=$C_8H_{17}NHSO_2$, m=0.7, f=1, k=0, X=$NR^7$, $R^7$=$CH_3$, δ=0], and (P6) [$A^1$=nil, $R^5$=$R^6$=H, X=$NR^7$, $R^7$=$CH_3$, f=1, Y=$C_8H_{17}NHSO_2$, m=0.7, k=0, δ=0]

0.50 g of N-methylisoindoline, produced by a known process (Advan. Heterocyc. Chem., 10, 113(1969)), was reacted in 4.0 ml of a sulfuric acid solution containing 2.0 ml of 20% fuming sulfuric acid for 3 hours at 90° C., the reaction solution was added to 100 ml of methanol, and the resulting precipitate was separated by centrifugation. The separated precipitate was dissolved in 100 ml of 0.5N aqueous sodium hydroxide, unnecessary materials, such as excess sodium hydroxide, were removed by dialysis with deionized water, the solvent was distilled off, and then the residue was vacuum dried to obtain 0.38 g of a Na-type polymer (M=$Na^+$).

The polymer obtained was dissolved in 50 ml of water, and carefully passed through an acidic ion-exchange resin (Amberlite IR-120B) to convert it into an acidic polymer (M=$H^+$). Then, the solvent was distilled off under reduced pressure to obtain a black polymer solid. The average substitution degree n of the isoindolylene structure unit in the polymer by the sulfonic acid was measured by the neutralization titration method and found to be 0.7. Thereafter, 0.24 g of the resulting polymer [$A^1$=nil, $R^5$=$R^6$=H, X=$NR^7$, $R^7$=$CH_3$, n=0.7, M=$H^+$] comprising a chemical structure in which φ of formula (V) is represented by formula (III) was dissolved in 20 ml of NMP and thereto 0.15 g (1.16 mmol) of n-octylamine was added, followed by reaction in accordance with Example 1. The subsequent processes were carried out in the same manner as in Example 1 to obtain 0.18 g of a black polymer. The polymer obtained was soluble in NMP, DMSO, DMF, and DMA, but insoluble in water. The electroconductivity of the polymer was $3 \times 10^{-10}$ S/cm.

The characteristic absorption in the infrared absorption spectrum (KBr method, $cm^{-1}$) of the polymer was as follows.

3080, 2960, 1380, 1225, 1180

EXAMPLE 3

Electroconductive Polymers (P1) [φ=isothianaphthenylene, $A^1$=nil, Y=$C_5H_{11}NHSO_2$, m=0.7, f=1, k=0, δ=0], and (P6) [$A^1$=nil, $R^5$=$R^6$=H, Y=$C_5H_{11}NHSO_2$, f=1, m=0.7, k=0, X=S, δ=0]

0.25 g of a polymer [$A^1$=nil, $R^5$=$R^6$=H, n=0.7, M=$H^+$] comprising a chemical structure in which φ of formula (V) is represented by formula (III), and produced in the same manner as in Example 1, was added to 20 ml of n-amylamine, and reacted with stirring at 100° C. for 6 hours under a nitrogen atmosphere. After the reaction, the reaction solution was processed in the same manner as in Example 1 to obtain 0.19 g of a deep blue polymer. $\lambda_{max}$ of the polymer was 846 nm in NMP.

The characteristic absorption in the infrared absorption spectrum (KBr method) of the resulting polymer was as follows.

$v_{N-H}$: 3080 $cm^{-1}$ $v_{S=O}$: 1190, 1217, 1380 $cm^{-1}$ $v_{C=C}$: 1465, 1620 $cm^{-1}$ $\delta_{C-H}$: 850 $cm^{-1}$ The electroconductivity of the polymer was $2 \times 10^{-4}$ S/cm.

EXAMPLE 4

Electroconductive Polymers (P1) [φ=isothianaphthenylene, $A^1$=nil, Y=$C_6H_5NHSO_2$, m=0.7, f=1, k=0, δ=0], and (P6) [$A^1$=nil, $R^5$=$R^6$=H, Y=$C_6H_5NHSO_2$, m=0.7, f=1, k=0, X=S, δ=0]

0.50 g of a polymer [$A^1$=nil, $R^5$=$R^6$=H, n=0.7, M=$H^+$] comprising a chemical structure in which φ of formula (V) is represented by formula (III) and produced in the same manner as in Example 1, and 0.22 g of aniline were reacted in 20 ml of NMP with stirring at 160° C. for 6 hours under a nitrogen atmosphere. Thereafter, the reaction mixture was processed in the same manner as in Example 1 to obtain 0.09 g of a deep blue polymer. $\lambda_{max}$ of the polymer was 842 nm in NMP.

The characteristic absorption in the infrared absorption spectrum (KBr method) of the resulting polymer was as follows.

$v_{N-H}$: 3080 $cm^{-1}$ $v_{S=O}$: 1170, 1216, 1378 $cm^{-1}$ $v_{C=C}$: 1650 $cm^{-1}$ $\delta_{C-H}$: 689 $cm^{-1}$ The electroconductivity of the polymer was $5 \times 10^{-5}$ S/cm.

EXAMPLE 5

Electroconductive Polymers (P1) [φ=isothianaphthenylene, $A^1$=nil, Y=$C_8H_{17}NHSO_2$, m=0.7, f=1, k=0, j=1, Z=$I^-$, δ>0], and (P6) [$A^1$=nil, $R^5$=$R^6$=H, Y=$C_8H_{17}NHSO_2$, m=0.7 f=1, k=0, X=S, j=1, Z=$I^-$, δ>0]

Figure 4:
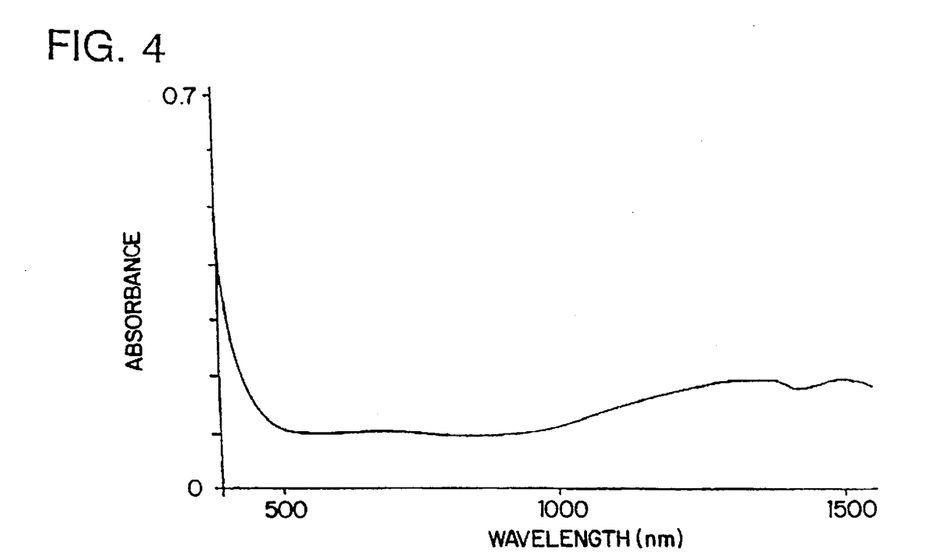
FIG. 4 is the visible near infrared absorption spectrum of the polymer obtained in Example 5 in DMF.

1.0 mg of an electroconductive polymer [φ=isothianaphthenylene, $A^1$=nil, $R^5$=$R^6$=H, Y=$C_8H_{17}NHSO_2$, m=0.7, k=0, δ=0], produced in the same manner as in Example 1, was dissolved in 100 ml of DMF, and thereto 0.05 ml of a 0.01 wt % iodine solution in DMF was added to effect an doping reaction with iodine. The resulting solution showed a spectrum of an electroconductive polymer in a doped state as shown in FIG. 4.

EXAMPLE 6

Electroconductive Polymers (P1) [φ=isothianaphthenylene, $A^1$=nil, Y=$C_5H_{11}OSO_2$, m=0.8, f=1, k=0, δ=0], and (P6) [$A^1$=nil, $R^5$=$R^6$=H, Y=$C_5H_{11}OSO_2$, m=0.8, f=1, k=0, X=S, δ=0]

0.25 g of a polymer [$A^1$=nil, $R^5$=$R^6$=H, n=0.8, M=$H^+$] comprising a chemical structure in which φ of formula (V) is represented by formula (III), and produced in the same manner as in Example 1, was added to 10 ml of n-amylamine, and reacted with stirring at 130° C. for 6 hours under a nitrogen atmosphere. Thereafter, the reaction solution was processed in the same manner as in Example 1 to obtain 0.22 g of a deep blue polymer. $\lambda_{max}$ of the polymer was 825 nm (in DMSO).

The characteristic absorption in the infrared absorption spectrum (KBr method) of the resulting polymer was as follows.

$v_{S=O}$: 1162, 1347 $cm^{-1}$ $v_{C=C}$: 1645 $cm^{-1}$ $\delta_{C-H}$: 842 $cm^{-1}$ The electroconductivity of the polymer was $4 \times 10^{-5}$ S/cm.

EXAMPLE 7

Electroconductive Polymers (P1) [φ=isothianaphthenylene, $A^1$=Nil, Y=$C_5H_{11}OSO_2$, m=0.8, f=1, k=0, j=1, Z=$I^-$, δ>0], and (P6) [$A^1$=nil, $R^5$=$R^6$=H, Y=$C_5H_{11}OSO_2$, X=S, m=0.8, f=1, k=0, j=1, Z=$I^-$, δ>0]

1.0 mg of an electroconductive polymer (P6) [$A^1$=nil, φ=isothianaphthenylene, $R^5$=$R^6$=H, Y=$SO_3C_5H_{11}$, m=0.8, k=0, f=1, δ=0], produced in the same manner as in Example 6, was dissolved in 100 ml of DMSO, and thereto 0.05 ml of a 0.01% iodine solution in DMF was added. The resulting solution showed a spectrum of an electroconductive polymer in a doped state similar to FIG. 4.

EXAMPLE 8

Electroconductive Polymers (P1) [φ=isothianaphthenylene, $A^1$=nil, Y=$C_8H_{17}NHSO_2$, m=0.6, f=1, k=0.2, M=$Na^+$, δ=0], and (P6) [$A^1$=nil, $R^5$=$R^6$=H, Y=$C_8H_{17}NHSO_2$, X=S, M=$Na^+$, m=0.6, k=0.2, δ=0, f=1]

0.25 g of a polymer [$A^1$=nil, $R^5$=$R^6$=H, M=$H^+$, n=0.8] comprising a chemical structure in which φ of formula (V) is represented by formula (III), and produced in the same manner as in Example 1, and 0.15 g (1.16 mmol) of n-octylamine were added to 20 ml of NMP, and reacted with stirring at 160° C. for 30 minutes under a nitrogen atmosphere. The reaction solution was added dropwise to 200 ml of 1,4-dioxane, and the precipitated product was separated by filtration (yield: 0.12 g). The product was water-soluble. The average substitution degree k of the isothianaphthenylene structure unit in the polymer was measured by the titration method using an NaOH standard solution, and found to be 0.2 per isothianaphthenylene structure unit. Further, the electroconductivity of the polymer product was measured by a four-terminal method and found to be $8 \times 10^{-2}$ S/cm. $\lambda_{max}$ was 820 nm when the polymer was neutralized with 20 ml of 0.05N NaOH.

EXAMPLE 9

Electroconductive Polymers (P1) [φ=isothianaphthenylene, $A^1$=nil, Y=$C_8H_{17}NHSO_2$, m=0.6, f=1, k=0.2, j=2, Z=sulfuric acid ion, M=$H^+$, δ>0], and (P6) [$A^1$=nil, $R^5$=$R^6$=H, Y=$C_8H_{17}NHSO_2$, m=0.6, k=0.2, X=S, M=$H^+$, Z=sulfuric acid ion, j=2, δ>0, f=1]

1.0 mg of the polymer obtained in Example 8 was dissolved in 20 ml of 0.5M sulfuric acid, and the resulting solution showed a spectrum of an electroconductive polymer in a doped state similar to FIG. 4.

EXAMPLE 10

Electroconductive Polymers (P2) [φ=isothianaphthenylene, $A^1$=nil, Y=$C_8H_{17}NHSO_2$, m=0.6, f=0, k=δ=0.2, M=nil], and (P6) [$A^1$=nil, $R_5$=$R^6$=H, Y=$C_8H_{17}NHSO_2$, m=0.6, k=0.2, X=S, δ=0.2, f=0, M=nil]

200 mg of a polymer, obtained in the same manner as in Example 8, was dissolved in 200 ml of 0.05N aqueous NaOH, adjusted to a pH of 1.9 with HCl, and desalted through an ultrafiltration membrane. The concentrated aqueous solution showed a spectrum of an electroconductive polymer in a doped state similar to FIG. 4. The polymer concentration after the ultrafiltration was about $2 \times 10^{-4}$ wt %. $Na^+$ concentration of the aqueous solution was measured using $Na^+$-selective electrode 1512A-06T manufactured by Horiba Seisakusho K. K., and found to be 10 ppm or less, and incapable of a Nernst response.

EXAMPLE 11

Electroconductive Polymers (P1) [φ=2,5-thienylene, $A^1$=$C_3H_6$, Y=$C_8H_{17}NHSO_2$, m=0.7, f=1, k=0.3, M=$H^+$, δ=0], and (P7) [$R^5$=H, $A^1$=$C_3H_6$, Y=$C_8H_{17}NHSO_2$, m=0.7, k=0.3, X=S, M=$H^+$, δ=0, F=1]

0.50 g of a polymer [$A^1$=$C_3H_6$, $R^5$=H, n=1.0, M=$H^+$] comprising a chemical structure in which φ of formula (V) is represented by formula (IV), and produced by a known method (*J. Chem. Soc. Chem. Commun.*, p. 1694 (1990)), and 0.32 g of n-octylamine were reacted in 20 ml of NMP with stirring at 120° C. for 4 hours under a nitrogen atmosphere. The reaction solution was processed in the same manner as in Example 1 to obtain 0.77 g of a deep black brown polymer. $\lambda_{max}$ of the polymer was 425 nm in DMF.

The characteristic absorption in the infrared absorption spectrum (KBr method, $cm^{-1}$) of the polymer was as follows.

3080, 2960, 1610, 1380, 1220, 1185

EXAMPLE 12

Electroconductive Polymer (P3) [$A^1$=$C_3H_6$, $OA^2$=nil, $A^3$=$CH_3$, Y=$C_3H_7NHSO_2$, m=0.6, k=0.4, M=$H^+$, f=1, δ=0]

0.25 g of poly[5-methoxy-2-(3-sulfopropoxy)-1,4-phenylenevinylene], which is a polymer [$A^1$=$C_3H_6$, $OA^2$=nil, $A^3$=$CH_3$, n=1.0, M=$H^+$] comprising a chemical structure represented by formula (VI) as a repeating unit, produced by a known method (*Macromolecules*, 23, 2119 (1990)), and 0.06 g of n-propylamine were reacted in 10 ml of NMP with stirring at 120° C. for 6 hours under a nitrogen atmosphere. The reaction solution was then processed in the same manner as in Example 1 to obtain 0.27 g of a dark brown polymer.

The characteristic absorption in the infrared absorption spectrum (KBr method, $cm^{-1}$) of the polymer was as follows.

2950, 1610, 1410, 1350, 1210, 1040

EXAMPLE 13

Electroconductive Polymers (P1) [φ=1,4-iminophenylene, $A^1$=nil, Y=$C_{10}H_{21}NHSO_2$, m=0.5, f=1, k=0, δ=0], and (P8) [$A^1$=nil, Y=$C_{10}H_{21}NHSO_2$, m=0.5, f=1, k=0, δ=0]

0.50 g of sulfonic acid group-substituted polyaniline, which is a polymer [$A^1$=nil, n=0.5, M=$H^+$] comprising a structural unit in which φ of formula (V) is 1,4-iminophenylene having an unsubstituted imino group, produced by a known method (*J. Amer. Chem. Soc.*, 112, 2800 (1990)), and 0.30 g of n-decylamine were reacted in 20 ml of NMP with stirring at 120° C. for 6 hours under a nitrogen atmosphere. The reaction solution was then processed in the same manner as in Example 1 to obtain 0.74 g of a black polymer.

The characteristic absorption in the infrared absorption spectrum (KBr method, $cm^{-1}$) of the polymer was as follows.

3300, 2970, 1620, 1490, 1380, 1220, 1165, 820

EXAMPLE 14

Electroconductive Polymers (P1) [φ=N-substituted 1,4-iminophenylene, $A^1$=$C_3H_6$, Y=$C_5H_{11}NHSO_2$, m=0.5, f=1, k=0.5, M=$H^+$, δ=0], and (P8) [$A^1$=$C_3H_6$, Y=$C_5H_{11}NHSO_2$, m=0.5, f=1, k=0.5, M=$H^+$, δ=0]

0.50 g of polyaniline propanesulfonic acid, which is a polymer comprising a structural unit in which φ of formula (V) is N-substituted type 1,4-iminophenylene [$A^1$=$C_3H_6$, n=1.0, M=$H^+$], produced by a known method (*J. Chem. Soc. Chem. Commun.*, 180 (1990)), and 0.20 g of n-amylamine were reacted in 20 ml of NMP with stirring at 120° C. for 3 hours under a nitrogen atmosphere. The reaction solution was then processed in the same manner as in Example 1 to obtain 0.59 g of a black polymer.

The characteristic absorption in the infrared absorption spectrum (KBr method, $cm^{-1}$) of the polymer was as follows.

3290, 2980, 1620, 1480, 1380, 1220, 1160, 820

EXAMPLE 15

Electroconductive Polymers (P1) [φ=2,5-pyrrolylene, $A^1$=$C_3H_6$, Y=$C_8H_{17}NHSO_2$, m=0.2, f=1, k=0, δ=0], and (P10) [$(A^4)_{1-n}$=nil, $A^1$=$C_3H_6$, Y=$C_8H_{17}NHSO_2$, m=0.2, f=1, k=0, δ=0]

0.50 g of poly(pyrrole-co-3-sulfopropylpyrrole) copolymer, which is a polymer in which φ of formula (V) is 2,5-pyrrolylene [$A^1=C_3H_6$, n=0.2, M=$H^+$], produced by a known method (*J. Chem. Soc. Chem. Commun.*, 621 (1987)), and 0.15 g of n-octylamine were reacted in 50 ml of NMP with stirring at 160° C. for 6 hours under a nitrogen atmosphere. The reaction solution was then processed in the same manner as in Example 1 to obtain 0.62 g of a black polymer.

The characteristic absorption in the infrared absorption spectrum (KBr method, $cm^{-1}$) of the polymer was as follows.

3100, 2935, 1500, 1450, 1225, 1190, 800

EXAMPLE 16

Electroconductive Polymers (P1) [φ=carbazolylene, $A^1=C_3H_6$, Y=$C_8H_{17}NHSO_2$, m=1.0, f=1, k=0, δ=0], and (P11) [$(A^4)_{1-n}$=nil, $A^1=C_3H_6$, Y=$C_8H_{17}NHSO_2$, m=0.1, f=1, k=0, δ=0]

0.50 g of poly[N-(3-sulfo)propyl-3,6-carbazolylene], which is a polymer in which φ of formula (V) is carbazolylene [$A^1=C_3H_6$, n=1.0, M=$H^+$], produced by a known method (*J. Electrochem. Soc.*, 137, 900 (1990)), and 0.22 g of n-octylamine were reacted in 50 ml of NMP with stirring at 150° C. for 8 hours under a nitrogen atmosphere. The reaction solution was then processed in the same manner as in Example 1 to obtain 0.63 g of a brown polymer.

The characteristic absorption in the infrared absorption spectrum (KBr method, $cm^{-1}$) of the polymer was as follows.

2940, 1660, 1450, 1220, 1180, 750

EXAMPLE 17

DMF containing the soluble electroconductive polymer in a doped state produced as in Example 5, and polyacrylonitrile, each in an amount of 1.0 wt %, was coated on the surface of a glass plate substrate by means of a spin-coater (at room temperature, rotation number: 1,000 rpm) to form a thin film having a thickness of about 1.0μ (measured by the needle-contact method). After vacuum drying at about 60° C. for 15 hours, the close adhesion between this thin film and the glass substrate was good, and the surface resistance was $1\times10^7$ Ω/□. The transmittance of visible light at 500 nm was 97%.

EXAMPLE 18

DMF containing 2.0 wt % of the electroconductive polymer (P6) [$A^1$=nil, $R^5=R^6$=H, Y=$C_8H_{17}NHSO_2$, m=0.7, k=0, X=S, δ=0], obtained as in Example 1, and 20 wt % of polyvinyl alcohol (polymerization degree: 2,000) was placed in a petri dish l(diameter: 5 cm), and the solvent was vacuum dried. A thin plate-shaped article having a thickness of about 1.0 mm formed in the dish was taken out. The surface resistance of this molded article was $10^{11}$ Ω/□, and after gas phase doping with iodine, it reached $10^7$ Ω/□ level.

While the invention has been described in detail and with reference to specific embodiments thereof, it will be apparent to one skilled in the art that various changes and modifications can be made therein without departing from the spirit and scope thereof.

What is claimed is:

1. A polymer which is electroconductive or which can be made electroconductive comprising a repeating unit having a chemical structure represented by formula (I):

wherein φ represents a divalent group selected from the group consisting of a divalent group of a monocyclic heterocyclic ring or a condensed heterocyclic ring, each having from 5 to 7 members, and a hetero atom selected from the group consisting of nitrogen, sulfur, oxygen, selenium and tellurium, a divalent group having vinylene connected with the above-described divalent group, arylene, and arylenevinylene; $A^1$, which may or may not be present, represents a linear or branched, saturated or unsaturated alkylene group having from 1 to 10 carbon atoms, with one terminal thereof substituting for H of the C—H bond or the N—H bond in φ to connect with the carbon or nitrogen atom, with the proviso that when $A^1$ is not present Y or $SO_3^-(M)_f$ is connected directly to the carbon or nitrogen atom in φ, and $A^1$ may optionally contain a carbonyl, ether, ester, thioether, amide, or sulfone bond; Y represents $SO_2NR^1R^2$, wherein $R^1$ and $R^2$ each independently represents hydrogen, a linear or branched, saturated or unsaturated alkyl group each having from 1 to 20 carbon atoms, or a substituted or unsubstituted aryl group having from 4 to 30 carbon atoms, wherein $R^1$ and $R^2$ may combine with each other to form a divalent saturated or unsaturated hydrocarbon chain which, together with the nitrogen atom, forms a heterocyclic structure, and the alkyl chain of $R^1$ or $R^2$ may optionally contain a carbonyl, ether, ester, thioether, amide or sulfone bond; M represents a cation; f represents 0 or 1; Z represents an anion; j represents 1 or 2 and indicates the absolute value of the valence number of Z; and δ ranges from 0 to 1, k and m each represents an average substitution degree of φ in the polymer, k is a value of 0<k≦1.9, m is a value of 0.1≦m<2, k+m is 2 or less when said substituent is bonded to the carbon atom in φ, k+m is 1 or less when bonded to the nitrogen atom, and k and δ are equal when f is 0, wherein the polymer is soluble in both water and an organic solvent, and wherein δf/j is the number of anion(s) Z, as expressed in a molar equivalent of anion(s) Z per a repeating unit of the polymer.

2. A polymer as claimed in claim 1, wherein φ has a nitrogen atom, wherein the nitrogen atom has a substituent $(A^4)_{1-n}$, wherein $A^4$ is a linear or branched, saturated or unsaturated alkyl group having from 1 to 10 carbon atoms, $A^4$ may optionally contain a carbonyl, ether, ester, thioether, amide, or sulfone bond, and 1–n is 1 or less and indicates an average substitution degree of the nitrogen atom by $A^4$ in the polymer.

3. A molded article which is electroconductive or which can be made electroconductive comprising the polymer claimed in claim 1.

4. A polymer which is electroconductive or which can be made electroconductive comprising a repeating unit having a chemical structure represented by formula (I) as claimed in claim 1, wherein δ is a value of 0<δ≦1 and f is 0.

5. A polymer as claimed in claim 1 or 4, wherein φ is 2,5-pyrrolylene with the nitrogen atom thereof having a substituent $(A^4)_{1-n}$, wherein $A^4$ represents a linear or branched, saturated or unsaturated alkyl group having from 1 to 10 carbon atoms, $A^4$ may optionally contain a carbonyl, ether, ester, thioether, amide, or sulfone bond, and 1–n is 1 or less and indicates an average substitution degree of the nitrogen atom by $A^4$ in the polymer.

6. A polymer as claimed in claim 1 or 4, wherein φ is carbazolylene with the nitrogen atom thereof having a substituent $(A^4)_{1-n}$, wherein $A^4$ represents a linear or branched, saturated or unsaturated alkyl group having from 1 to 10 carbon atoms, $A^4$ may optionally contain a carbonyl, ether, ester, thioether, amide, or sulfone bond, and 1–n is 1 or less and indicates an average substitution degree of the nitrogen atom by $A^4$ in the polymer.

7. A process for producing a polymer as claimed in claim 1 or 4, which comprises condensing a polymer comprising a repeating unit having a chemical structure represented by formula (V), with a primary- or secondary-amine, alcohol, or thiol:

wherein φ represents a divalent group selected from the group consisting of a divalent group of a monocyclic heterocyclic ring having from 5 to 7 members or a condensed heterocyclic ring having from 9 to 40 members, and a hetero atom of said ring being selected from the group consisting of nitrogen, sulfur, oxygen, selenium and tellurium, a divalent group having vinylene connected with the above-described divalent group, arylene, and arylenevinylene and, $A^1$, which may or may not be present, represents a linear or branched, saturated or unsaturated alkylene group having from 1 to 10 carbon atoms, with one terminal thereof substituting for H of the C—H bond or the N—H bond in φ to connect with the carbon or nitrogen atom, with the proviso that when $A^1$ is not present Y or $SO_3^-M$ is connected directly to the carbon or nitrogen atom in φ, and $A^1$ may optionally contain a carbonyl, ether, ester, thioether, amide, or sulfone bond, and M represents a cation, with the proviso that n ranges from 0.1 to 2 and indicates the substitution degree of φ by $A^1SO_3^-M$ in the polymer, n is 2 or less when said substitutent is bonded to the carbon atom in φ, and n is 1 or less when bonded to the nitrogen atom.

8. A polymer as claimed in claim 1 or 4, wherein φ is a divalent group of a condensed heterocyclic ring represented by formula (III):

wherein $R^5$ and $R^6$ each independently represents hydrogen, a linear or branched, saturated or unsaturated alkyl or alkoxy group having from 1 to 20 carbon atoms, a halogen, a nitro group, an amino group, a trihalomethyl group, or a substituted or unsubstituted phenyl group, and X represents sulfur, oxygen, selenium, tellurium, or $NR^7$, wherein $R^7$ represents hydrogen, a linear or branched, saturated or unsaturated alkyl group having from 1 to 10 carbon atoms, or a substituted or unsubstituted aryl group having from 6 to 10 carbon atoms.

9. A molded article which is electroconductive or which can be made electroconductive comprising the polymer claimed in claim 8.

10. A polymer as claimed in claim 1 or 4, wherein φ is a divalent group of a monocyclic heterocyclic ring represented by formula (IV):

wherein $R^5$ represents hydrogen, a linear or branched, saturated or unsaturated alkyl or alkoxy group having from 1 to 20 carbon atoms, a halogen, a nitro group, an amino group, a trihalomethyl group, or a substituted or unsubstituted phenyl group, and X represents sulfur, oxygen, selenium, tellurium, or $NR^7$, wherein $R^7$ represents hydrogen, a linear or branched, saturated or unsaturated alkyl group having from 1 to 10 carbon atoms, or a substituted or unsubstituted aryl group having from 6 to 10 carbon atoms.

11. A molded article which is electroconductive or which can be made electroconductive comprising the polymer claimed in claim 10.

12. A polymer which is electroconductive or which can be made electroconductive comprising a repeating unit having a chemical structure containing a phenylenevinylene skeleton represented by formula (II):

wherein $A^1$, which may or may not be present, represents a linear or branched, saturated or unsaturated alkylene group having from 1 to 10 carbon atoms, with the proviso that when $A^1$ is not present Y or $SO_3^-(M)_f$ is connected directly with the oxygen atom bonded to phenylene; $A^2$ and $A^3$ each independently represents hydrogen or a linear or branched, saturated or unsaturated alkyl group having from 1 to 10 carbon atoms, and $A^1$, $A^2$ or $A^3$ may optionally contain a carbonyl, ether, ester, thioether, amide, or sulfone bond; Y represents $SO_2NR^1R^2$, wherein $R^1$ and $R^2$ each independently represents hydrogen, a linear or branched, saturated or unsaturated alkyl group having from 1 to 20 carbon atoms, or a substituted or unsubstituted aryl group having from 4 to 30 carbon atoms, wherein $R^1$ and $R^2$ may combine with each other to form a divalent saturated or unsaturated hydrocarbon chain which, together with the nitrogen atom, forms a heterocyclic structure, and the alkyl chain of $R^1$ or $R^2$ may optionally contain a carbonyl, ether, ester, thioether, amide or sulfone bond; M represents a cation; f represents 0 or 1; Z represents an anion; j represents 1 or 2 and indicates the absolute value of the valence number of Z; and δ ranges from 0 to 1, with the proviso that the total number of the substituent $OA^1Y$, $OA^1SO_3^-(M)_f$ and/or $(OA^2)_{1-k-m}$ per repeating unit having said substituent is 1, k and m each represents an average substitution degree of φ in the polymer, k is a value of 0<k ≤0.9, m ranges from 0.1 to 1, k+m is 1 or less, and k and δ are equal when f is 0, wherein the polymer is soluble in both water and an organic solvent, and wherein δf/j is the number of anion(s) Z, as expressed in a molar equivalent of anion(s) Z per a repeating unit of the polymer.

13. A molded article which is electroconductive or which can be made electroconductive comprising the polymer claimed in claim 4.

14. A molded article which is electroconductive or which can be made electroconductive comprising the polymer claimed in claim 12.

15. A polymer as claimed in claim 12, wherein δ is a value of 0<δ≦1 and f is 0.

16. A process for producing a polymer as claimed in claim 12 or 15, which comprises condensing a polymer comprising a repeating unit having a chemical structure represented by formula (VI), with a primary- or secondary-amine, alcohol, or thiol:

wherein $A^1$, which may or may not be present represents a linear or branched, saturated or unsaturated alkylene group having from 1 to 10 carbon atoms, with one terminal thereof connecting with the oxygen atom bonded to the phenylene, with the proviso that when $A^1$ is not present $SO_3^-M$ is bonded directly to the oxygen atom, $A^2$ and $A^3$ each independently represents hydrogen or a linear or branched, saturated or unsaturated alkyl group having from 1 to 10 carbon atoms, $A^1$, $A^2$ or $A^3$ may optionally contain a carbonyl, ether, ester, thioether, amide, or sulfone bond, and M represents a cation, with the proviso that n ranges from 0.1 to 1 and indicates an average substitution degree of the phenylene by $OA^1SO_3^-M$ in the polymer.

17. A molded article which is electroconductive or which can be made electroconductive comprising the polymer claimed in claim 15.

* * * * *